United States Patent [19]

Collot et al.

[11] Patent Number: 5,075,825

[45] Date of Patent: Dec. 24, 1991

[54] MOTOR VEHICLE HEADLIGHT INCLUDING AN INDICATOR DEVICE FOR INDICATING THE ELEVATION DIRECTION OF ITS REFLECTOR

[75] Inventors: Patrice Collot, Pantin; Jean-Marie Brel, Claye-Souilly; Ghislaine Pinson, Villeneuve-La-Garenne, all of France

[73] Assignee: Valeo Vision, Bobigny, France

[21] Appl. No.: 657,464

[22] Filed: Feb. 19, 1991

[30] Foreign Application Priority Data

Feb. 20, 1990 [FR] France ................................ 90 02027

[51] Int. Cl.$^5$ ................................................ B60Q 1/00
[52] U.S. Cl. ........................................ 362/61; 362/66; 362/269; 362/285; 362/418; 362/427
[58] Field of Search ..................... 362/61, 80, 66, 269, 362/273, 285, 289, 418, 419, 420, 421, 422, 427, 428; 33/335, 365, 354, 370, 379

[56] References Cited

U.S. PATENT DOCUMENTS

| | | | |
|---|---|---|---|
| 3,612,854 | 10/1971 | Todd et al. | 362/269 |
| 4,485,430 | 11/1984 | Fustel | 362/80 |
| 4,628,414 | 12/1986 | Ricard | 362/427 |
| 4,722,033 | 1/1988 | Van Puyn et al. | 362/80 |
| 4,794,495 | 12/1988 | McMahon et al. | 362/66 |
| 4,802,067 | 1/1989 | Ryder et al. | 362/61 |
| 4,916,583 | 4/1990 | Nagasawa | 362/428 |
| 4,922,387 | 5/1990 | Ryder et al. | 362/61 |
| 4,970,629 | 11/1990 | McMahon | 362/61 |
| 4,984,136 | 1/1991 | Yamagishi et al. | 362/80 |

FOREIGN PATENT DOCUMENTS 8-910911 9/1989 Fed. Rep. of Germany .
1173501 7/1989 Japan .
1173502 7/1989 Japan .

Primary Examiner—Ira S. Lazarus
Assistant Examiner—Sue Hagarman

[57] ABSTRACT

A motor vehicle headlight comprising a light source, a reflector, a housing, and a front glass, and further comprising an indicator device for indicating the elevation direction of the reflector, the indicator device being of the type comprising a spirit level mounted on the reflector in a plane which is essentially vertical and parallel to the optical axis defined by the reflector, and being in a predetermined angular relationship with the optical axis. An opening is formed through a top wall of the housing. The spirit level is mounted on the reflector via a support member extending upwards towards the opening. The spirit level is situated outside the housing, at least in part.

5 Claims, 1 Drawing Sheet

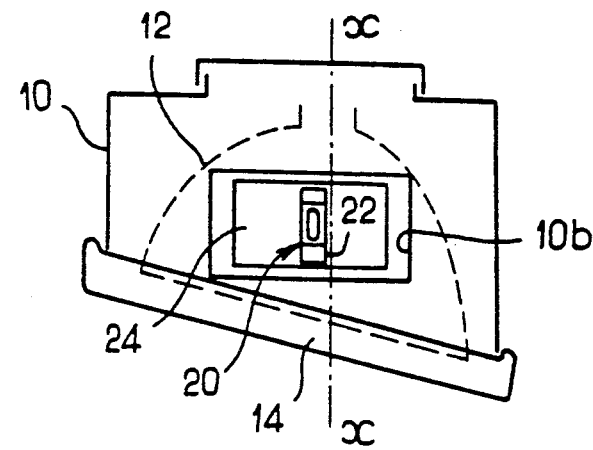
FIG_1
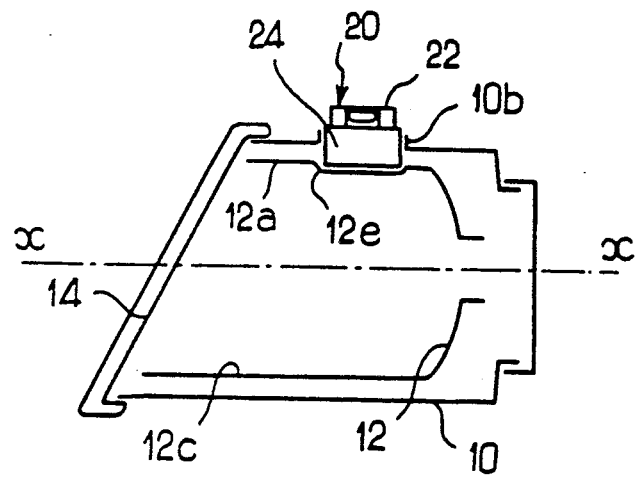
FIG_2
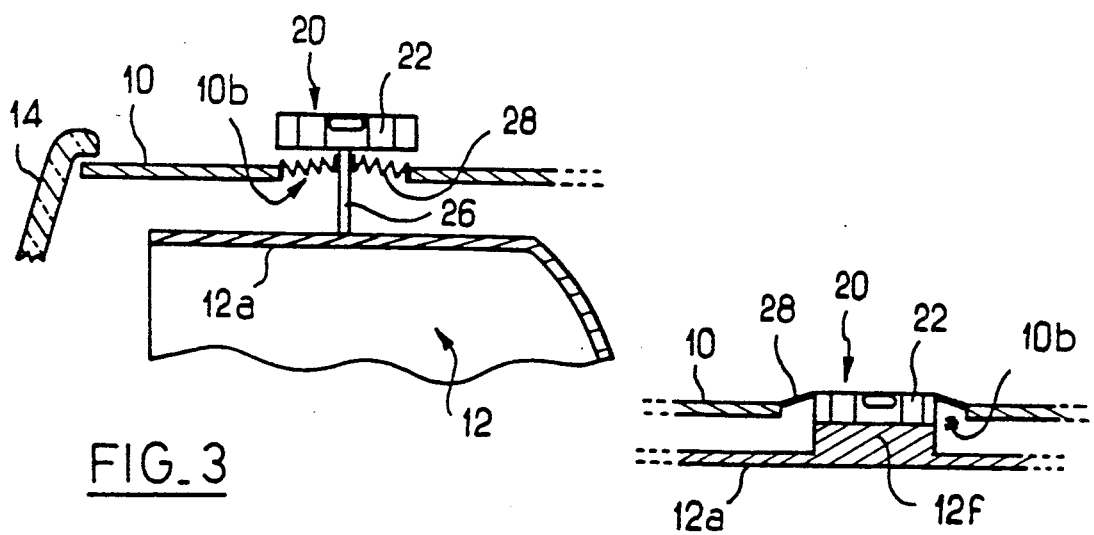
FIG_3
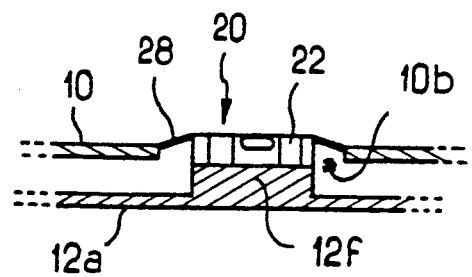
FIG_4

MOTOR VEHICLE HEADLIGHT INCLUDING AN INDICATOR DEVICE FOR INDICATING THE ELEVATION DIRECTION OF ITS REFLECTOR

The present invention relates in general to adjusting the direction in which motor vehicle headlights point.

It relates more particularly to a headlight including an indicator device for indicating the elevation direction of its reflector for the purpose of bringing the optical axis defined by said reflector into a given plane, e.g. the horizontal plane, while performing adjustment operations.

BACKGROUND OF THE INVENTION

Japanese patent application published under the number 1-173 501 discloses a headlight in which a spirit level is used to indicate the direction in which the reflector is pointing relative to the horizontal for the purpose of performing elevation adjustment on the beam. The spirit level is mounted on the top of the top portion of the reflector and may be observed from the outside either through a backwardly curved-over top portion of the closure glass, or else through a transparent window provided in the top wall of the headlight housing.

A major drawback of this prior indicator device lies in the difficulty in observing the spirit level during adjustment operations, in particular since the eye of the operator must be in alignment with the spirit level and with the observation window in the glass or the housing, or merely because said window has become dirty.

The present invention seeks to provide headlight having an indicator device which is easier to observe, particularly under difficult conditions.

SUMMARY OF THE INVENTION

To this end, the present invention provides a motor vehicle headlight comprising a light source, a reflector, a housing, and a front glass, and further comprising an indicator device for indicating the elevation direction of the reflector, the indicator device being of the type comprising a spirit level mounted on said reflector in a plane which is essentially vertical and parallel to the optical axis defined by said reflector, and being in a predetermined angular relationship with said optical axis, wherein: an opening is formed through a top wall of the housing; the spirit level is mounted on the reflector via a support member extending upwards towards said opening; and said spirit level is situated outside the housing, at least in part.

BRIEF DESCRIPTION OF THE DRAWING

Embodiments of the invention are described by way of example with reference to the accompanying drawing, in which:

FIG. 1 is a diagrammatic plan view of a headlight fitted with an indicator device constituting a first embodiment of the invention;

FIG. 2 is a diagrammatic vertical axial section view through the FIG. 1 headlight;

FIG. 3 is a fragmentary vertical section view through a first variant embodiment; and FIG. 4 is a fragmentary vertical section view through a second variant embodiment.

MORE DETAILED DESCRIPTION

With reference initially to FIG. 1, a headlight comprises a housing 10, a reflector 12 (shown in dashed lines) situated inside the housing, and a glass 14 closing the front of the housing. A lamp (not shown) co-operates with the reflector to form a beam.

A spirit level 20 conventionally constituted by a transparent cylindrical tube 22 provided with reference marks and containing a liquid (not necessarily a spirit) and a bubble is mounted as explained in greater detail below on the reflector in such a manner that the axis of the tube 22 is in a well-defined angular relationship with an optical axis xx defined by said reflector. Specifically, the angular relationship may be accurate parallelism, but other relationships are also possible. A window 10a is also formed through the top wall of the housing to enable the spirit level to be observed from outside the housing.

Means are also provided of entirely conventional design not described herein for the purpose of displacing the reflector 12 by pivoting it about a horizontal line extending essentially transversely to its optical axis, thereby varying the elevation angle of said optical axis and of the generated beam.

When it is desired to adjust the reference position of the reflector so as to bring its optical axis into a determined plane (horizontal in the present example) the means for displacing the reflector are actuated while observing the spirit level 20 until the spirit level indicates that the desired horizontal direction has been obtained.

In this first embodiment, the spirit level 20 is removable and is applied to the reflector via a special adaptor only on those occasions that an adjustment operation is to be performed.

More precisely, the spirit level 20 is mounted on a support 24 having a bottom surface capable of co-operating removably with the top surface of the top portion 12a of the reflector 12 in such a manner that when the support is installed on said top portion, the above-specified angular relationship obtains. In order to prevent the spirit level and its support 24 moving during the adjustment operation, mutual retaining means may be provided between the support 24 and the top portion 12a. For example, the base of the support 24 may be received in a shallow complementary depression 12e formed in the top portion as shown in FIG. 2. This figure also shows that the top wall of the headlight housing 10 includes an opening 10b enabling the spirit level 20 and its support 24 to be installed. If necessary, means (not shown) may be provided to close said opening once the adjustment operation has been completed and the spirit level and its support have been removed.

FIG. 2 shows that the spirit level projects through the top wall of the headlight housing 10, thereby making it easy to observe.

In this first embodiment of the invention, the spirit level is removable, so headlight manufacturing cost is minimized with only a small number of spirit levels being necessary in factories, and in maintenance and repair workshops, etc. . .

FIGS. 3 and 4 show variant embodiments in which the spirit level is mounted permanently on the reflector, again with a predetermined angular relationship relative to the optical axis.

In FIG. 3, an essentially vertical support rod 26 is provided between the top portion 12a of the reflector and the spirit level 20. This rod passes through an opening 10b in the top wall of the housing so that the spirit level projects above said top wall, thereby providing optimum readability.

In another important aspect of the invention, a flexible sealing membrane 28 is provided between the rim of the opening 10b and an intermediate level on the rod 26. This membrane allows the rod and the spirit level to follow the motion of the reflector 12 during an adjustment operation without hindering it, while nevertheless ensuring good sealing of the inside volume of the headlight. This variant is particularly suitable for sealed beam type lights in which total sealing is required for the inside volume of the headlight.

In the variant of FIG. 4, the top portion 12a of the reflector includes a projection 12f that coincides with the opening 10b in the housing, which projection may or may not be integral with the reflector. The spirit level 20 is fixed on the top surface of the projection 12f, with the top surface of the spirit level from which readings are made lying slightly above the top wall of the housing 10. For the same purposes as in the embodiment of FIG. 3, a flexible sealing membrane 28 is provided between the rim of the opening 10b and the spirit level itself.

Naturally, the person skilled in the art will be able to design any variant or modification lying within the scope of the following claims.

We claim:

1. A motor vehicle headlight comprising a light source, a reflector, a housing, and a front glass, and further comprising an indicator device for indicating the elevation direction of the reflector, the indicator device being of the type comprising a spirit level mounted on said reflector in a plane which is essentially vertical and parallel to the optical axis defined by said reflector, and being in a predetermined angular relationship with said optical axis, wherein:

an opening is formed through a top wall of the housing;

the spirit level is mounted on the reflector via a support member extending upwards towards said opening; and said spirit level is situated outside the housing, at least in part.

2. A headlight according to claim 1, in which the spirit level and the support member are removably mounted on the reflector.

3. A headlight according to claim 2, in which the spirit level and the support member are placed on a surface of a top portion of the reflector.

4. A headlight according to claim 1, in which the spirit level, the support member, and the reflector are fixed to one another and in which a flexible sealing membrane is provided between the housing and the support member.

5. A headlight according to claim 1, in which the spirit level, the support member, and the reflector are fixed to one another and in which a flexible sealing membrane is provided between the housing and the spirit level.

* * * * *